United States Patent Office 3,525,705
Patented Aug. 25, 1970

3,525,705
FLAME-RESISTANT POLYURETHANES PREPARED FROM CERTAIN PHORPHORUS COMPOUNDS
Charles Lichtenberg Harowitz, Richmond, Va., assignor to Mobil Oil Corporation, a corporation of New York
No Drawing. Filed Apr. 20, 1959, Ser. No. 807,328
Int. Cl. C08g 22/44, 22/08
U.S. Cl. 260—2.5                                          8 Claims

ABSTRACT OF THE DISCLOSURE

Fire-retardant polyurethane products are formed by reacting a polyisocyanate with a particular phosphorus-containing compound formed from the reaction of a particular acid or ester of phosphorus with an alkylene oxide or dioxide. When an ester of phosphorus is desired to be reacted with the alkylene oxide or dioxide, it may be produced by reacting $P_2O_5$ with an alcohol, polyol, or mixtures thereof. Advantageously, the $P_2O_5$ is reacted with butanol at temperatures below about 70° C. for a period of time sufficient such that the reaction product has a primary acidity of about 5.98 meq./g, and a total acidity of about 7.17 meq./g. Thereafter, this reaction product is reacted with propylene oxide at about 35–45° C. to obtain a propoxylated dibutyl pyrophosphoric acid. The propoxylated dibutyl pyrophosphoric acid reaction product is thereafter reacted with a polyisocyanate to form a fire-retardant polyurethane resin.

---

This invention relates to urethane polymers which have improved fire-retardant and self-extinguishing properties. More particularly, it relates to cellular polyurethanes which have vastly improved fire-retardant and self-extinguishing properties. It is especially concerned with rigid, cellular, polyurethanes having these properties.

Urethane polymers and processes for their manufacture and for their transformation into foamed rigid, semi-rigid and flexible materials are well known. These polymers are formed by the reaction of a compound containing at least two active hydrogen atoms per molecule and a polyisocyanate, usually a diisocyanate of aromatic type. Such compounds include the polyols such as polyesters and polyethers.

To make a cellular foamed product, usually the polyol is reacted with an excess of polyisocyanate to give a prepolymer containing unreacted NCO groups. Normally from 5–40% excess is used, the amount depending on the viscosity desired and the method of foaming. One method of foaming the polyurethane product includes the addition of water, a catalyst and additional active hydrogen compounds, such as additional polyols. The water reacts with the isocyanate generating carbon dioxide which is trapped in the viscous mass as the reaction proceeds. The catalyst promotes cross-linking of the polymer chains and as the foaming mass expands and reaches the point of setting, or curing, it contains a plurality of tiny cells.

Another method of foaming generally requires less of the excess polyisocyanate and the cellular structure is obtained by use of a low-boiling, inert liquid which is added at the same time as the catalyst and the additional active hydrogen compound. As the reaction proceeds, heat is generated and the low-boiling, inert liquid is vaporized. This vapor is trapped in the viscous mass and setting takes place as described previously Other methods of preparing the foamed urethane polymers are also known.

Among the conventional polyols which are used in the formation of polyurethanes are included the reaction products of polybasic acids such as adipic, phthalic, sebacic, succinic, oxalic, ricinoleic, and the like with a polyhydric alcohol such as ethylene, diethylene, propylene and butylene glycol, 1,4-butanediol, glycerol, trimethylol propane, trimethanol ethane, 1,2,6-hexanetriol, 1,2,4-butanetriol, and the like. Polyalkylene ether glycols have also been used. A good discussion of polyurethanes is contained in the book entitled "Polyurethanes' by Bernard A. Dombrow, Reinhold Publishing Corporation, New York, 1957.

In addition to having utility in the manufacture of cellular products, the urethane polymers are also used in other applications. For example, they may be cast as films and used as packaging material. They may be cast in molds to form a variety of articles that are used in diverse applications. Urethane polymers have been used in the manufacture of rubber-like goods and some have found utility as adhesives. Generally, these polymers are adaptable to uses served by many of the well-known polymers of today.

A principal disadvantage and thus a factor which limits the potential uses of products manufactured from the polyurethanes is the fact that they may be readily ignited and burned. This is particularly true of the foamed materials. While fire-retardant compounds and processes are known, particularly in the textile art, the application of such compounds onto or admixed with a cellular polyurethane is not practicable. The deposition of a coating or the physical incorporation of such compounds on foam is severely limited since the materials used in this manner are susceptible to migration, solvents, weathering, washing, and the like. Thus, the cost of the original treated product is increased without any appreciable permanent increase in its fire-resistant characteristics.

Accordingly, it is an object of this invention to provide a fire-retarded urethane polymer wherein the fire-retardant is a structural part of the polyurethane, thus providing a strong chemical bond therewith and obviating the poor fire-retardance which is usually found in polyurethanes, particularly foamed polyurethanes and the loss of fire-resistant properties from foamed polyurethanes which have been treated with a fire-retarding additive composition.

Another object of this invention is to produce a fire-resistant, self-extinguishing, rigid, semi-rigid, or flexible cellular polyurethane.

It is a further object of this invention to produce a fire-resistant polyurethane foam which is light in weight, but substantially rigid and useful for a number of purposes including fire-resistant panelling for structures, such as airplanes, buildings, etc.

In attaining the objects of this invention, one feature resides in reacting a polyisocyanate with a phosphorus compound containing at least two active hydrogen atoms per molecule. A second feature resides in foaming the reaction product or otherwise producing a usable commercial material.

Another feature of this invention resides in reacting an aromatic diisocyanate compound with a phosphorus containing compound formed from the reaction of an acid of phosphorus with an alkylene oxide or dioxide such as ethylene oxide, propylene oxide, butylene oxide, dicyclopentadiene dioxide, 1,4-butadiene dioxide, and the like, the acid of phosphorus having at least two hydroxyl groups per molecule, and subsequently foaming the resultant isocyanate reaction product.

Other objects, features and advantages of this invention will be more apparent from the following description of the invention.

It has been found that if all or a certain amount of the conventional active hydrogen compound, such as a polyol, now used in making polyurethane foams is replaced by a phosphorus compound containing at least two active hydrogen atoms per molecule, and particularly the product of an acid of phosphorus having at least two hydroxyl groups per molecule with an alkylene oxide, the degree of fire-retardance in the finished product is remarkably improved. The degree of fire-retardance depends upon the amount of phosphorus compound which is used. As the amount is decreased, the fire-retardance is also decreased, but there is an improved fire-retardant property when even as little as 5% of the phosphorus containing compound is used to replace 5% of the conventional polyol, the replacement being figured on the basis of active hydrogen equivalents.

As stated above, the phosphorus compounds which are useful in this invention are those that contain at least two active hydrogen atoms per molecule. There are many types of chemical structures that contain active hydrogen, and it is contemplated that all of these types are embraced by this invention. Non-limiting examples of active hydrogen radicals that can be associated with phosphorus in an organic chemical compound are:

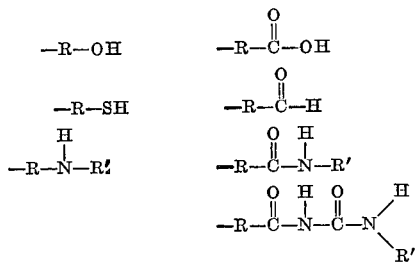

wherein —R— represents an alkylene or arylene radical or a series of alkylene or arylene radicals which may be separated by heteroatoms such as O, N and S; as for example, —CH$_2$CH$_2$OCH$_2$CH$_2$OCH$_2$CH$_2$—,

—C$_6$H$_4$—C$_6$H$_4$—

C$_6$H$_4$OC$_6$H$_4$—, or others, connected to a phosphorus atom directly or through oxygen, sulfur or nitrogen and R' represents an alkyl or aryl radical or hydrogen.

The more useful phosphorus containing compounds are those that contain hydroxyl groups to supply the active hydrogen. Among these the invention contemplates the use of both organic and inorganic phosphorus compounds containing at least two hydroxyl groups. These are best catagorized by the number of active hydrogen atoms present.

(A) Those that contain two active hydrogen atoms per molecule.
(I) Inorganic
(a) Phosphorous acid

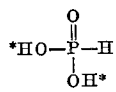

(II) Organic
(a) Monoesters of phosphoric acid

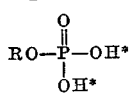

(b) Phosphonic acids

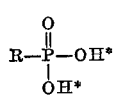

(c) Diesters of pyrophosphoric acid

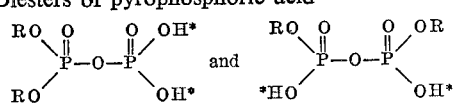

(d) Diphosphinic acids

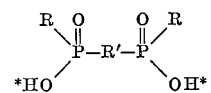

(e) Diesters of diphosphoric acids

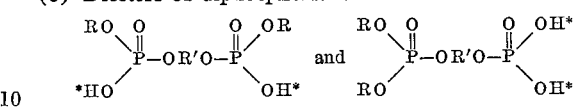

(f) Diesters of diphosphonic acids

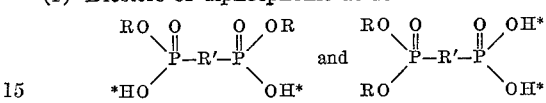

(g) An alkylene oxide or dioxide addition product of any of the compounds represented in A–I–(a) and A–II–(a–f), the alkylene oxide being

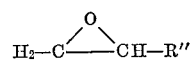

wherein R" represents H, CH$_3$, C$_2$H$_5$ and CH$_2$Cl.

In the above formulae R represents an alkyl or aryl radical, substituted or unsubstituted, and R' represents an alkylene or arylene radical or a series of alkylene or arylene radicals which may be separated by heteroatoms such as O, N and S; as for example,

—CH$_2$CH$_2$OCH$_2$CH$_2$OCH$_2$CH$_2$—

—C$_6$H$_4$—C$_6$H$_4$—, —C$_6$H$_4$OC$_6$H$_4$—, or others. The "*" denotes active hydrogen.

(B) Those that contain more than two active hydrogen atoms per molecule.
(I) Inorganic
(a) Phosphoric acid

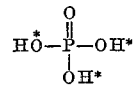

(b) Pyrophosphoric acid

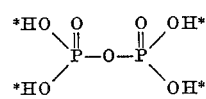

(c) Polyphosphoric acids, such as tripolyphosphoric acid.
(II) Organic
(a) Monoesters of polyphosphoric acid

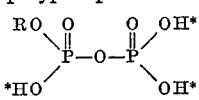

(b) Diphosphonic acids

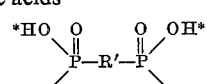

(c) Monoesters of diphosphonic acids

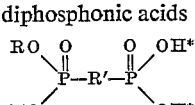

(d) Diphosphoric acids

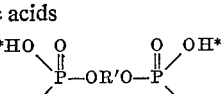

(e) Monoesters of diphosphoric acids

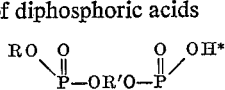

(f) The product of a glycol, HOR'OH, reacted with P$_2$O$_5$ (g) The product of a polyglycol, H[OR']$_x$OH, reacted with P$_2$O$_5$
(h) The product of a mixture of a glycol or polyglycol and an alcohol, ROH, reacted with P$_2$O$_5$
(i) The product of a polyhydroxy compound reacted with P$_2$O$_5$
(j) An alkylene oxide or dioxide addition product of any of the compounds represented in B–I–(a–c) and B–II–(a–i), the alkylene oxide being one in which the oxygen atom is attached to adjacent carbon atoms and having the formula

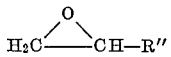

wherein R'' represents H, CH$_3$, C$_2$H$_5$ and CH$_2$Cl.
(k) Any one of the products represented in A–II–(g) and B–II–(j) reacted with P$_2$O$_5$
(l) Any one of the products represented in B–II–(k) reacted with an alkylene dioxide or oxide represented by

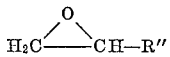

wherein R'' represents H, CH$_3$, C$_2$H$_5$ and CH$_2$Cl.

In the above formula R represents an alkyl or aryl radical, substituted or unsubstituted, R' represents an alkylene or arylene radical or a series of alkylene or arylene radicals which may be separated by heteroatoms such as O, N and S; as for example,

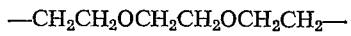

—C$_6$H$_4$—C$_6$H$_4$—, —C$_6$H$_4$OC$_6$H$_4$—, or others, and $x$ represents a positive whole number. The "*" denotes active hydrogen.

Of the many compounds represented above in A and B, among the preferred organic phosphorus compounds having at least two active hydrogen atoms per molecule which can be reacted with the polyisocyanates are included the reaction products of alkylene oxides and phosphoric acid and the reaction products of dialkyl pyrophosphoric acids and alkylene oxide.

In practicing the invention, an organic phosphorus compound containing at least two active hydrogen atoms per molecule, or a mixture of this plus the normally used polyol, is mixed with an aromatic diisocyanate, such as tolylene diisocyanate and the mixture heated to form a prepolymer. To produce the foamed product, about 5 to 40% excess diisocyanate, calculated as unreacted NCO, is present in the mixture. The mixture is then treated with a catalyst, a surfactant, additional phosphorus-containing product and/or conventional polyol, and either water or a low boiling inert liquid such as a chlorofluorocarbon, i.e. one of the Freons. Foaming takes place and the material is cured at a temperature of from 25 to 100° C. for a period of from about 10 minutes to about 2 hours. A white, light-weight, cellular material is formed.

For the purpose of this invention, it is necessary that the acid of phosphorus contain at least two hydroxyl groups per molecule. Less than two groups does not facilitate cross-linking and polymer formation. When a difunctional phosphorus compound is used, it has been found that the best practical fire-retardancy is obtained when from about 5% to about 70% of the phosphorus compound is used to replace the conventional active hydrogen compound. When the phosphorus compound is trifunctional or greater, from about 30% to 100% of the conventional active hydrogen compound can be replaced with the phosphorus containing compound for the best practical fire-retardancy. However, in both instances acceptable fire-retardancy may be obtained for some applications by employing amounts of phosphorus compounds either greater or smaller than the above suggested percentages. The polyisocyanates which are used are those that are well known in the art of forming ordinary polyurethanes, and no elaborate discussion of these compounds is believed necessary.

The following are illustrative examples of this invention and it must be understood that the invention is not to be limited by these examples.

EXAMPLE I

Rigid foam prepared from tolylene diisocyanate and propoxylated phosphoric acid.—Freon blown (a) Prepolymer formation.—300 grams of propoxylated phosphoric acid prepared according to U.S. 2,372,244, with a hydroxyl number of about 365 and 672.8 g. of tolylene diisocyanate (80% 2,4-tolylene diisocyanate and 20% 2,6-tolylene diisocyanate) were placed in a 1000-ml. flask fitted with a stirrer and a thermometer. The mixture was blanketed with nitrogen to exclude moisture. While stirring, the temperature was raised to 90° C. and was maintained at 90° C.±3° C. for a period of ½ hour, then was cooled to about 25° C. The product was a pale yellow liquid containing 25.04% unreacted NCO groups (based on the total weight of the mixture). The viscosity of the liquid was 3,200 centipoises at 23° C.

(b) Foaming.—To 50.0 g. of the material from (a) in a 400-ml. stainless steel beaker was added 45.3 g. (stoichiometrically equivalent to the unreacted NCO), of the propoxylated phosphoric acid of (a). 14.2 g. of CCl$_3$F, Du Pont's Freon-11, and 0.5 g. of an organosilicone block polymer surfactant having the formula:

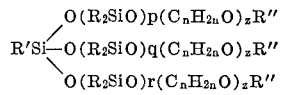

wherein R and R'' are methyl groups, R' is an ethyl group, $p$, $q$ and $r$ have an average value of 3, the (C$_n$H$_{2n}$O)$_z$ unit represents a polyoxyethylene block containing an average of 16 oxyethylene units, wherein $z$ is equal to 16 and $n$ is equal to 2, were added to the mixture and all of the materials were thoroughly mixed. Some Freon was lost during the mixing operation and had to be replaced. After mixing, 0.5 ml. of dibutyl tin dilaurate catalyst was added, the mixture stirred rapidly for 15–20 seconds and the entire contents poured into a 6" x 6" x 4" paper carton coated with commercial floor (paste) wax. Foaming began immediately. The foaming mixture was placed in an oven maintained at 70° C. The maximum height of the foam was reached about 30 seconds after the mixture was poured into the paper carton. The foam became non-tacky after 5 minutes and had attained a major portion of its final strength after 10 minutes at 70° C. The foam was removed from the oven after this final strength was reached and was discharged from the carton.

EXAMPLE II

Rigid foam prepared from tolylene diisocyanate, propoxylated phosphoric acid and a conventional polyol.—Freon blown (a) Prepolymer formation.—300 grams of propoxylated phosphoric acid and 57.0 g. of tolylene diisocyanate were placed into a 2-l. flask fitted with a thermometer and stirrer. Nitrogen was used to blanket the reactants to exclude moisture. While stirring, the temperature of the mixture was raised to 100° C. and was maintained there for one hour. 0.034% unreacted NCO groups remained after this heating period. 970.0 g. of additional tolylene diisocyanate was added, and the temperature of the mixture dropped to around 60° C. The temperature was raised to 70° C., and stirring was continued for ½ hour at this temperature. The product was then cooled to about 25° C. The product was a pale yellow liquid containing 31.1% unreacted NCO groups and had a viscosity of 600 centipoises at 20° C.

(b) Foaming.—The foam was prepared by the same procedure as in Example I(b). The quantities of materials used were 50 g. of the prepolymer of II(a), 31.7 g.

7 of propoxylated phosphoric acid, 22.0 g. of a commercially available polyether based triol with a hydroxyl number of about 378, 15.6 g. of Freon-II, 0.6 g. dibutyl tin dilaurate and 0.6 g. of the surfactant defined in I(b).

Included among the known available polyether polyols which can be used in forming polyurethanes are Union Carbide's Niax Triol LK-380 [which is the commercially available polyether based triol referred to in II(b)], Atlas G-2410 (a propylene oxide adduct of sorbitol having a hydroxyl number of about 490) and Wyandotte's Pluracol TP-440 (a propylene oxide adduct of trimethylolpropane with a hydroxyl number of about 380).

EXAMPLE III

Rigid foam prepared from tolylene diisocyanate, propoxylated phosphoric acid and a conventional polyol.—Freon blown (a) Prepolymer formation.—The prepolymer of Example II(a) was used.

(b) Foaming.—The foam was prepared as in Example I(b), except that only 9.9 g. of propoxylated phosphoric acid was used, the remainder of the active hydrogen being supplied by 44.0 g. of the conventional triol of Example II(b). In adidtion, the Freon content was increased to 15.6 g., the dibutyl tin dilaurate was increased to 0.6 ml. and the surfactant was upped to 0.6 g.

EXAMPLE IV

Rigid foam prepared from tolylene diisocyanate and a conventional polyol.—Freon blown (a) Prepolymer formation.—50 grams of the triol of Example II(b) and 342.0 g. of tolylene diisocyanate (80% 2,4-tolylene diisocyanate and 20% 2,6-tolylene diisocyanate) were placed in a 2000-ml. flask fitted with a stirrer, thermometer an an apparatus for blanketing the mixture under an atmosphere of nitrogen. The mixture was stirred and the reaction temperature was raised to 70° C. 50.0 g. of aditional triol was added and the temperature was allowed to rise to 90° C. The mixture was heated at 90° C. for 30 minutes and then cooled to 50° C. before storing. The product was a pale-yellow liquid containing 30.3% unreacted NCO groups and had a viscosity of 800 centipoises at 25° C.

(b) Foaming.—47 grams of the above prepolymer, 50.0 g. of the triol, 0.60 g. of the silicone surfactant of Example I(b) and 20.5 g. of the Freon ($CCl_3F$) were placed in a 400-ml. stainless steel beaker and were thoroughly mixed. Some of the Freon had to be replaced because of loss during mixing. 0.6 gram of dibutyl tin dilaurate catalyst was placed in the mixture and the mixture was stirred for 10-20 seconds. Foaming began almost immediately, and the foaming mixture was poured into a 6″ x 6″ x 4″ paper carton coated with a commercial paste (floor) wax. The carton containing the foaming mixture was placed in a 70° C. oven for 10 minutes. The foam became non-tacky in less than one minute, and had obtained a major portion of its strength in 2-3 minutes at the 70° C. temperature.

EXAMPLE V

Rigid foams prepared from tolylene diisocyanate and a conventional polyol, from tolylene diisocyanate and propoxylated phosphoric acid, or from tolylene diisocyanate, a conventional polyol and propoxylated phosphoric acid.—Freon blown (a) Prepolymer formation.—(1) 300 grams of propoxylated phosphoric acid was mixed with 668.5 g. of tolylene diisocyanate and the mixture was heated to 90° C. for ½ hour. The entire reaction was conducted under a blanket of nitrogen. At the end of the heating period, the mixture was allowed to cool to room temperature. The product had a viscosity of 3,340 centipoises at 21° C. and the amount of of unreacted NCO groups was 25.06%.

(2) 300 grams of propoxylated trimethylolpropane with a hydroxyl number of 373 [see Example II(b)] was mixed with 682 g. of tolylene diisocyanate and the mixture was heated to 90° C. for ½ hour. The entire reaction was conducted under a blanket of nitrogen. At the end of the heating period, the mixture was allowed to cool to room temperature. The product had a viscosity of 4,400 centipoises at 25° C. and the amount of unreacted NCO groups was 24.7%.

(b) Foam preparation.—Four different foams were prepared from the prepolymers 1 and 2 above. These foams were made by mixing the ingredients shown in the table below; the dibutyl tin dilaurate catalyst being added last. The mixture of ingredients was stirred for 15-20 seconds and then poured into a 5″ x 5″ x 4″ coated paper container. This was placed in an oven at 50° C. and cured. The foams had a density of 2.8-2.9 lbs./cu. ft.

FOAM COMPOSITIONS

| | Grams | | | |
|---|---|---|---|---|
| | No. 1 | No. 2 | No. 3 | No. 4 |
| Prepolymer 1 | | | | 50.0 |
| Prepolymer 2 | 50.0 | 50.0 | 50.0 | |
| Propoxylated $H_3PO_4$ | | 18.2 | 36.3 | 46.3 |
| Propoxylated trimethylolpropane [See Example II(b)] | 44.2 | 26.7 | 9.2 | |
| Poly(dimethyl silicone) DC-200 of Example XI(c) | 0.5 | 0.5 | 0.5 | 0.5 |
| $CCl_3F$ (Freon) | 14.4 | 14.4 | 14.4 | 14.4 |
| Dibutyl tin dilaurate | 0.4 | 0.4 | 0.4 | 0.4 |

EXAMPLE VI

Preparation of rigid foams from conventional polyester polyols and phosphatic polyols (a) Prepolymer.—The prepolymer used in the following foam preparations was the reaction product obtained by reacting, at 70-90° C. under an atmosphere of nitrogen for about one hour, 80 parts of tolylene diisocyanate with approximately 20 parts of a typical phthalic-adipic type polyester polyol (such as, Selectron 6002) having an hydroxyl number of 438. The prepolymer contained an excess of 30.5% unreacted NCO groups.

(b) Foaming.—(1) A control polyester based foam was prepared by placing 50 g. of prepolymer (VI-a), 48.5 g. of the polyester polyol of Example VI(a), 0.4 g. of the silicone surfactant of Example I(b) and 17.0 g. of Freon-11 in a 400-ml. stainless steel beaker. After thoroughly stirring, for 10-15 seconds any Freon-11 loss due to evaporation was replaced, 0.25 g. of triethylamine was added and vigorous stirring was employed for 10-15 seconds. The entire contents were poured into a 6″ x 6″ x 4″ paper carton coated with a commercial paste wax. The foam was placed immediately into a preheated oven at 40-50° C. and kept at this temperature until it had attained a major portion of its final strength (5-10 minutes).

(2) Another foam was prepared exactly as outlined above except that 12.0 g. of propoxylated dibutyl pyrophosphoric acid [see Example XI(a)] and 41.2 g. of the polyester polyol of VI(a) above were used.

EXAMPLE VII

Rigid foam prepared from tolylene diisocyanate and propoxylated phosphoric acid.—Carbon dioxide blown (a) Prepolymer formation.—The prepolymer of Example II(a) was used.

(b) Foaming.—To 66.0 g. of the above prepolymer in a 400-ml. stainless steel beaker were added 41.0 g. of propoxylated phosphoric acid, 2.0 ml. of water and 0.7 ml. of the silicone surfactant of Example I(b). The mixture was stirred thoroughly and 0.82 ml. of N-methylmorpholine was added, after which the materials were rapidly mixed for 10-20 seconds. The mixture was poured into a 6″ x 6″ x 4″ carton lined with ordinary floor (paste) wax and was placed into an oven which was maintained at 95° C. The maximum rise was reached in 2-3 minutes. It became non-tacky in about 15 minutes and was still somewhat soft after 30 minutes at 95° C. The foam was then removed from the oven and its strength increased rapidly upon cooling to room temperature.

EXAMPLE VIII

Rigid foam prepared from tolylene diisocyanate, propoxylated phosphoric acid, and a conventional polyol.—Carbon dioxide blown (a) Prepolymer formation.—The prepolymer from Example II(a) was used.

(b) Foaming.—The foam was prepared exactly according to Example VII(b), with the following exceptions: The polyols used were propoxylated phosphoric acid (23.7 g.) and the conventional triol of Example II(b) (16.8 g.). The foam became non-tacky in 10 minutes.

EXAMPLE IX

Rigid foam prepared from tolylene diisocyanate propoxylated phosphoric acid and a conventional polyol.—Carbon dioxide blown (a) Prepolymer formation.—The prepolymer from Example II(a) was used.

(b) Foaming.—The foam was prepared exactly as in Example VII(b), with the following exceptions: The polyols used were propoxylated phosphoric acid (4.8 g.) and the conventional triol (33.3 g.). The foam became non-tacky in 5 minutes and the maximum strength was reached in 20 minutes at 95° C. without removal from the oven.

EXAMPLE X

Rigid foam prepared from tolylene diisocyanate and a conventional polyol.—Carbon dioxide blown (a) Prepolymer formation.—The prepolymer of IV(a) was used.

(b) Foaming.—To 66.0 g. of the prepolymer in a 400-ml. stainless steel beaker were added 35.0 g. of the conventional triol of Example II(b), .07 ml. of the surfactant of Example I(b) and 2.0 g. of water. The materials were mixed by stirring and 0.82 ml. of N-methylmorpholine catalyst was added. The mixture was stirred rapidly and foaming began immediately. The ingredients were transferred from the beaker to a wax coated 6″ x 6″ x 4″ paper carton. The foam was cured in an oven at 90° C. for 30 minutes.

The foams prepared in each of the above examples were subjected to the following test for determination of their fire-resistance.

A five-inch square block of the foam, ½ inch thick, was placed horizontally on a 3-inch ring clamp. A micro Bunsen burner with a 2½-inch flame was placed under the sample so that the tip of the flame just touched the bottom center of the sample. The burner was held in this position until the flame broke through the top of the foam. The burner was then immediately removed. A record was made of the time required to break through the foam; the time the foam continued to burn after removal of the burner; and the time required to burn completely to the ring clamp, if it was not extinguished prior to reaching the clamp. If the sample was self-extinguishing in 5 second or less, the burner flame was reapplied for an additional five seconds and the additional burning time was recorded. The results are contained in Table I.

TABLE I.—FREON BLOWN FOAMS

| Example | Time to break through (sec.) | Self ext. | Time to burn to ring (sec.) | Burn time before self ext. (sec.) | Burn time on reignition (sec.) |
|---|---|---|---|---|---|
| I | 12 | Yes | | 2 | 1.5 |
| II | 12 | No | 45 | | |
| III | 13 | No | 36 | | |
| IV (control) | 8 | No | 25 | | |
| V-1 (control) | 14 | No | 30 | | |
| V-2 | 13 | No | 35 | | |
| V-3 | 10 | Yes | | 45 | |
| V-4 | 13 | Yes | | 28 | |
| VI-1 (control) | 14 | No | 45 | | |
| VI-2 | 17 | Yes | | 44 | |

CO₂ Blown Foams

| Example | Time To break through (sec.) | Self ext. | Time To burn to ring (sec.) | Burn time before self ext. (sec.) | Burn time on reignition (sec.) |
|---|---|---|---|---|---|
| VII | 8 | Yes | | 4 | 2 |
| VIII | 8 | Yes | | 17 | |
| IX | 12 | No | 85 | | |
| X (Control) | 7 | No | 30 | | |

From the above table, it is apparent that the foams which did not contain the phosphorus reaction product burned readily to the inside periphery of the ring. Examples I, V-4 and VII which did not contain any of the conventional polyols, but only the propoxylated phosphoric acid, did not burn to the ring, and were self-extinguishing. After break-through, Examples I and VII merely burned 2 and 4 seconds, respectively; and on re-ignition, burned 1½ and 2 seconds, respectively. The remaining examples, wherein some of the conventional polyol was substituted by the propoxylated phosphoric acid showed remarkable improvement over the control samples IV, V-1, VI-1 and X, which burned completely to the edge of the ring in 30 seconds or less.

Fire-retardant foams have also been prepared from other alkoxylated phosphoric acids, such as ethoxylated phosphoric acid.

EXAMPLE XI

Flexible foam prepared from tolylene diisocyanate, conventional polyols, and propoxylated dibutyl pyrophosphoric acid (a) Preparation of propoxylated dibutyl pyrophosphoric acid.—426 grams of $P_2O_5$ was added slowly over a period of 2.5 hours to 444.7 g. of butyl alcohol. The alcohol was stirred throughout the addition and the temperature was maintained below 15° C. The external cooling was removed when the addition was completed, and th temperature rose to 35–40° C. in about two hours. Stirring was stopped after four hours and the product was allowed to stand overnight at room temperature. The product was then heated two hours at 70° C. There was obtained 863 g. of acidic product having a primary acidity of 5.98 meq./g. and a total acidity of 7.17 meq./g.

To 420 g. of the above product, propylene oxide was added dropwise while the mixture was stirred at a temperature of 35–45° C. After no more oxide would react, the excess oxide was removed and there was obtained 805 g. of propoxylated dibutyl pyrophosphoric acid. This material was found to have an hydroxyl number of about 210.

(b) Prepolymer formation.—In a nitrogen atmosphere, 34.1 g. of the propoxylated dibutyl pyrophosphoric acid, 91.9 g. of a tetrafunctional hydroxy compound, sold under the trademark of Tetronic 701 by Wyandotte Chemicals Corp., and 237.5 g. of polypropylene glycol (PPG 2025 of Union Carbide Corp.) were mixed together. To this mixture was added 80.6 g. of tolylene diisocyanate (80% 2,4- and 20% 2,6-). The mixture was stirred, heated to 100° C. and held at this temperature for two hours. The temperature was then lowered to 60° C. and 63.7 g. of additional tolylene diisocyanate added. The mixture was stirred for 15–20 minutes and discharged from the reaction vessel. The viscosity at 23° C. was 4,200 centipoises and the percent unreacted NCO was 8.7%.

Tetronic 701 has the following formula:

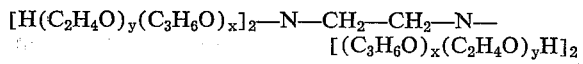

$$[H(C_2H_4O)_y(C_3H_6O)_x]_2-N-CH_2-CH_2-N-[(C_3H_6O)_x(C_2H_4O)_yH]_2$$

wherein $y$ is approximately 6 and $x$ is approximately 12.

(c) Foaming.—60 grams of the above prepolymer was mixed with 1.4 g. water, 0.3 g. dimethyl silicone (DC 200, a product of Dow-Corning Corp. having a viscosity index of 50 centistokes at 25° C.), 0.6 g. N-methylmorpholine and 0.18 g. triethylamine. The foaming mixture was placed in the oven at 70° C. for 25 minutes. It was then cured at 121° C. for 3 hours to form a flexible cellular polyurethane.

EXAMPLE XII

Flexible foam prepared from tolylene diisocyanate and conventional polyols

A control foam was prepared exactly as in Example XI with the exception that the prepolymer was made by using 600 g. of PPG 2025, 200 g. of Tetronic 701, 124.6 g. tolylene diisocyanate for the first addition and 171.8 g. of tolylene diisocyanate for the second addition. The unreacted NCO content was 9.10% and the viscosity at 17° C. was 6,800 centipoises.

The products of Examples XI and XII were then tested for burning characteristics. A sample strip, ½″ x 1″ x 6″ in size, was clamped at an angle of 45°. A flame was applied to the lower end and the time for burning 4″ of the strip was recorded. The material containing no phosphorus compound (Example XII) burned four inches in 39 seconds. The material made with the phosphorus compound (Example XI) was self-extinguishing; that is, when the applied flame was removed, the fire on the strip was extinguished.

EXAMPLE XIII

Preparation of films and coatings using propoxylated dibutyl pyrophosphoric acid and conventional polyols Films and coatings were prepared on wax paper using the following compositions.

Formulation No. 1:
 Prepolymer of Example IV(a)—5 g.
 Triol of Example II(b)—2 g.
 Propoxylated dibutyl pyrophosphoric acid—6 g.
 Dibutyl tin dilaurate—0.16 ml.
Formulation No. 2:
 Prepolymer of Example IV(a)—5 g.
 Triol of Example II(b)—2 g.
 Polypropylene glycol 475 (Union Carbide)—4.7 g.
 Dibutyl tin dilaurate—0.16 ml.

The polyols and prepolymers in both cases were mixed together, stirred and the catalyst was then added. After thoroughly mixing, a film was cast on common waxed paper using a doctor blade. The paper and film were placed in a preheated oven at 40-45° C. Formulation No. 1 was tack-free in approximately 30 minutes and No. 2 was tack-free in approximately 15 minutes. After 30 minutes in the oven at 40-45° C., the samples were removed and were held at room temperature for one hour. The films measured approximately 15 mils in thickness.

Flame properties of the two samples were run in the following manner:

A sample of each specimen was tested as (1) a coating; and (2) a film.

For testing as a coating, a specimen was prepared by cutting a strip 1″ x 8″ (coating dimension) with a ½″ side strip of waxed paper remaining attached along a longitudinal edge of the control strip. The strip was hung vertically and the flame was applied to the paper on the lower corner of the strip.

For evaluation as a film, a 1″ x 10″ strip was cut and the wax paper completely removed therefrom. A strip of waxed paper 2″ x 1″ was pressed onto one end of the film strip so that 1½″ of the paper extended beyond the strip. The strip was hung vertically and the flame was applied to the extended paper.

Formulation No. 1 in the coating test simply burned the ½″ fringe wax paper strip and as soon as it reached the coated area, it immediately became self-extinguishing. No flame was noted after 12 seconds. Only about ⅛″ of the coating was seriously burned with some discoloration noted up to approximately ¼″ into the vertical edge. Formulation No. 2 on the other hand continued to burn after the paper had been consumed and burned until approximately ½″ of the vertical edge had burned, at which point the area where the supporting wire was attached had burned (27 seconds) and the sample dropped off. It continued to burn and was snuffed out after burning for approximately 1 minute when it was apparent that the fallen sample was going to be entirely consumed.

In the film test, Formulation No. 1 burned for two seconds at which point the paper had burned and the heat caused the film to melt. Several inflamed drops fell off but did not continue to burn. At the same time, the test specimen went out. The entire proceedings gave a self-extinguishing time of 3 seconds from the time the paper was ignited. On the other hand, Formulation No. 2 burned for 27 seconds after which time the entire specimen was consumed except for approximately ½″ at the top. During the burning, inflamed molten drops fell off and continued to burn until consumed (several minutes).

EXAMPLE XIV

Preparation of films and coatings using propoxylated dibutyl pyrophosphoric acid and conventional polyols Films 0.15 in. thick of the two formulations below were cast on waxed paper and placed in a 40° C. oven until non-tacky (ca. 25 min.). The ingredients were mixed (catalyst added last) and then spread on the paper with a doctor blade. After curing, films were obtained by removing the waxed paper.

The formulations were:

| | Grams | |
|---|---|---|
| | No. 1 | No. 2 |
| Prepolymer [see V(a)(2)] | 25.0 | 25.0 |
| Propoxylated trimethylolpropane | 7.5 | 7.5 |
| Propoxylated dibutyl pyrophosphoric acid | | 27.0 |
| Polypropylene glycol 425 | 22.0 | |
| Dibutyl tin dilaurate | 1.0 | 1.0 |

The coatings and stripped films were flame-tested according to the previously outlined procedure in Example XIII. The results were:

No. 1—Burned completely in both tests. Film burn time was 24 sec. Coating burn time was 21 sec.

No. 2—Became self-extinguishing as soon as igniter-paper on film was consumed. Only ½ in of film was seared. The film was ignited for 5 sec. and extinguished in 2 sec. after flame removal.

In the coating test the vertical edge was seared ⅛ in. No burning was noted beyond the coated area.

EXAMPLE XV

Preparation of thermosetting molding material from isocyanates with phosphatic and conventional polyols Two molded articles approximately 1″ x 1″ x 8″ were prepared according to the following two formulations.

Formulation No. 1:                                G.
 Prepolymer of Example I(a) _____ 100
 Triol of Example II(b) _____ 88
 Dibutyl tin dilaurate _____ .5
Formulation No. 2:
 Prepolymer of Example I(a) _____ 100
 Propoxylated phosphoric acid _____ 90.6
 Dibutyl tin dilaurate _____ .5

In both cases, the above quantities of materials were thoroughly mixed (catalyst added last) in a 400 ml. stainless steel beaker. Approximately 30 seconds after the catalyst had been added, the material began to rise in temperature and a 1″ x 1″ x 8″ paper form (coated with ordinary floor wax) was filled with this material. Within approximately 5 minutes, the material had set-up enough to retain its shape without support. The evolution of heat continued at an accelerated rate for approximately 10-15 minutes and then gradually cooled. The sample gradually increased in hardness as it cooled and cured. No external heat was applied.

Approximately 4 hours after the samples had been poured, several cuts (½″ x ⅛″ x 6″) were made from each block. The flame properties were determined by placing a sample of each formulation in a horizontal position held by a clamp on one end. Each ½″ x ⅛″ x 6″ sample had marks inscribed 1″ and 5″ from the free ends.

Formulation No. 1 was ignited by a micro-bunsen burner (about 2″ flame) held at a 45° angle on the free end for 5 seconds. The specimen ignited and continued to burn. As soon as the flame reached the first mark (1″ from free end) the rate of burning was timed. The flame reached the second mark (4″ of material consumed) in 4 minutes 35 seconds. Therefore, the burning rate was approximately 1 minute, 9 seconds per inch.

A sample of Formulation No. 2 (same size— ½″ x ⅛″ x 6″) was treated in the same manner as No. 1. The specimen was self-extinguishing on three successive 5 second ignitions. The flame was then held to the sample until the flame had reached the 1″ mark, at which point the flame was removed and the specimen became self-extinguishing in 7 seconds. The specimen was then re-ignited for three successive 30-second ignition periods. In each case, the specimen was self-extinguishing on an average of about 4 seconds. Each reignition was applied immediately after the flame went out from the preceding ignition.

EXAMPLE XVI

Preparation of thermosetting molding material from isocyanates with phosphatic and conventional polyols Three molded articles were prepared from prepolymers (V(a)(1) and V(a)(2). They were made by mixing the ingredients shown in the table below (catalyst added last) and pouring the stirred mixture into a mold. Each article had set in approximately 3 minutes at room temperature.

MOLDED ARTICLE COMPOSITIONS

|  | Grams | | |
| --- | --- | --- | --- |
|  | No. 1 | No. 2 | No. 3 |
| Prepolymer [see V(a)(1)] |  |  | 100.0 |
| Prepolymer [see V(a)(2)] | 100.00 | 100.0 |  |
| Propoxylated $H_3PO_4$ |  | 60.7 | 92.8 |
| Propoxylated trimethylolpropane (see IIb) | 87.4 | 30.0 |  |
| Dibutyl tin dilaurate | 0.3 | 0.3 | 0.3 |

The above articles were flame-tested according to the previously outlined procedure in Example XII.

No. 1—Ignited for 5 sec. and continued to burn when flame was removed. Burned 4 in. in 3 min. 42 sec. Drippings continued to burn after falling from specimen.

No. 2—Self-extinguishing—flame held to sample successively for periods of 5, 5, 10, 30, 30, 30 and 30 sec. with extinguishing times of >1, >1, >1, 5, 25, 19 and 44 sec. respectively. The drippings did not burn.

No. 3—Self-extinguishing—flame held to sample successively for periods of 5, 5, 10, 30, 30 and 30 sec. with extinguishing times of >1, >1, >1, 1, 1 and 2 sec. respectively. The drippings did not burn.

Fire-retardant cellular or solid products similar to those obtained in Examples I–III, (V–2)–(V–4), VI–2, VII–IX, XI, XV, XIII–1, XIV–2, XV–2 and XVI–3, have been obtained from the use of the following phosphorus-containing reaction products: ethoxylated alkyl and aryl acid phosphates where alkyl and aryl groups were represented by methyl, ethyl, butyl, pentyl, hexyl, octyl, dodecyl, phenyl, tolyl, chlorophenyl, and octylphenyl; propoxylated butylphosphonic acid; propoxylated hydroxymethylphosphonic acid; ethoxylated, propoxylated and chloropropoxylated mono- and di-alkyl and aryl pyrophosphoric acids where alkyl and aryl groups were represented by methyl, ethyl, isopropyl, butyl, octyl, chloroethyl, and tolyl; products of phosphorus pentoxide with glycols, such as, ethylene, diethylene, triethylene, propylene, dipropylene, neopentyl, octylene, hydroquinone, bisphenol, polypropylenes, polyethylenes, 1,3-butanediol, 1,4-butanediol, 1,3-propanediol, 1,5-pentanediol subsequently reacted wtih ethylene oxide, propylene oxide and epichlorohydrin; products of phosphorus pentoxide with a mixture of the above glycols and hydroxy compounds such as water, and alcohols such as 2-chloroethyl, butyl, octyl, allyl and dodecyl, subsequently reacted with ethylene oxide, propylene oxide and epichlorohydrin; the alkoxylated products of the reaction of a polyhydroxy compound with phosphorus pentoxide, the polyhydroxy compound being 1,2,6-hexanetriol, glycerol, and pentaerythritol; and so-called "block polymers" obtained by reacting any of the above alkoxylated products with phosphorus pentoxide and subsequent alkoxylation with ethylene oxide, propylene oxide, and epichlorohydrin.

While in the above examples I have disclosed the replacement of all or a portion of the polyols normally used in making polyurethanes with my phosphorus-containing polyol, it is intended to cover other methods of incorporating my phosphorus-containing polyol in polyurethanes as long as they do not constitute departures from the spirit and scope of this invention. I have in mind for example, those methods whereby my phosphorus-containing compounds may be reacted with other materials, such as, for example adipic acid and/or phthalic anhydride and other polybasic acids and/or anhydrides to form mixed phosphorus polyester-based type polyols having at least two active hydrogen atoms per molecule which may be subsequently reacted with polyisocyanates to form polyurethanes.

Having described the invention, what is claimed is:

1. A fire-retardant polyurethane resin comprising the reaction product of (A) an organic polyisocyanate and (B) the reaction product consisting of the reaction of a member selected from the group consisting of monoesters of phosphoric acid, diesters of diphosphoric acids, monoesters and diesters of pyrophosphoric acid, and monoesters of diphosphoric acids with an oxide other than epihalohydrin selected from the group consisting of alkylene oxide and alkylene dioxides.

2. A fire-retardant polyurethane resin in accordance with claim 1 wherein said oxide is selected from the group consisting of ethylene oxide, propylene oxide, and butylene oxide.

3. A fire-retardant polyurethane resin comprising the reaction product of (A) an organic polyisocyanate and (B) the reaction product consisting of the reaction of $P_2O_5$ and a member selected from the group consisting of an alcohol, a polyol, and mixtures thereof, the product of which is subsequently reacted with an alkylene oxide.

4. A fire-retardant polyurethane resin in accordance wtih claim 3 wherein said $P_2O_5$ is reacted with a member selected from the group consisting of an alcohol, a glycol, a polyglycol, and mixtures thereof; and said alkylene oxide is selected from the group consisting of an ethylene oxide, propylene oxide, and butylene oxide.

5. A method of producing the fire-retardant polyurethane resin of claim 3 which comprises:

(a) reacting $P_2O_5$ with 2 moles of butanol for every mole of $P_2O_5$ employed, (b) reacting propylene oxide with the reaction product of (a) by adding excess propylene oxide for a sufficient period of time until no further oxide reacts, (c) removing excess propylene oxide from said reaction product of (b), and (d) reacting the reaction product of (c) with an organic polyisocyanate to thereby produce a fire-retardant polyurethane resin.

6. A method in accordance with claim 5 wherein said $P_2O_5$ is initially added to said butanol at about 15° C. and after the addition of all of the $P_2O_5$ to the butanol, maintaining the admixture at a temperature below about 70° C. for a sufficient period of time until the primary acidity of the reaction product is about 5.98 meq./g. and the total acidity of the reaction product is about 7:17 meq./g.

7. A method in accordance with claim 6 wherein said propylene oxide is added to the reaction product of (a) at a temperature of about 35–45° C. and maintained at this temperature range until no more oxide reacts.

8. A polyurethane foamed product having chemically combined therein a phosphorus compound selected from the group consisting of
 (1) phosphoric acid,
 (2) phosphorous acid and
 (3) a monoester of phosphoric acid.

References Cited

UNITED STATES PATENTS

| | | | |
|---|---|---|---|
| 2,284,896 | 6/1942 | Hanford et al. | 260—77.5 |
| 2,372,244 | 3/1945 | Adams et al. | 252—49.9 |
| 2,577,281 | 12/1951 | Simon et al. | 260—2.5 |
| 2,915,496 | 12/1959 | Swart et al. | 260—2.5 |
| 2,732,367 | 1/1956 | Shokal | 260—67 |
| 2,948,690 | 8/1960 | Fox | 260—77.5 |
| 2,952,666 | 9/1960 | Coover et al. | 260—77.5 |
| 2,691,567 | 10/1954 | Kvalnes et al. | 260—77.5 |

FOREIGN PATENTS 792,016  3/1958  Great Britain.

OTHER REFERENCES

Clark and Hawley, The Encyclopedia of Chemistry, Rheinhold Publishing Corp., 1957.

DONALD E. CZAJA, Primary Examiner

M. J. WELSH, Assistant Examiner

U.S. Cl. X.R.

156—331; 260—75, 77.5, 928, 932, 933, 950